(12) United States Patent
Da Silva

(10) Patent No.: US 9,849,518 B2
(45) Date of Patent: Dec. 26, 2017

(54) AUTOBALANCING SYSTEM FOR BORING TOOL AND BORING TOOL INCORPORATING SAME

(71) Applicant: Kennametal Inc., Latrobe, PA (US)

(72) Inventor: Marcelo Euripedes Da Silva, São Paulo (BR)

(73) Assignee: KENNAMETAL INC., Latrobe, PA (US)

( * ) Notice: Subject to any disclaimer, the term of this patent is extended or adjusted under 35 U.S.C. 154(b) by 133 days.

(21) Appl. No.: 14/885,508

(22) Filed: Oct. 16, 2015

(65) Prior Publication Data

US 2016/0107241 A1   Apr. 21, 2016

(30) Foreign Application Priority Data

Oct. 21, 2014   (BR) .......................... 1020140262466

(51) Int. Cl.
    *B23B 29/034*   (2006.01)
(52) U.S. Cl.
    CPC .... *B23B 29/03417* (2013.01); *B23B 2250/04* (2013.01); *B23B 2250/12* (2013.01); *Y10T 408/45* (2015.01); *Y10T 408/8588* (2015.01)
(58) Field of Classification Search
    CPC .......... B23B 29/03417; B23B 2250/04; Y10T 408/8588
    See application file for complete search history.

(56) References Cited

U.S. PATENT DOCUMENTS

| 4,175,894 | A | * | 11/1979 | Skrentner ......... B23B 29/03417 |
| | | | | 408/1 R |
| 4,229,127 | A | | 10/1980 | Bartley |
| 4,626,144 | A | | 12/1986 | Berner |
| 5,174,697 | A | | 12/1992 | Ariyoshi |
| 5,251,511 | A | | 10/1993 | Muendlein |
| 5,316,417 | A | | 5/1994 | Romi |
| 5,326,198 | A | | 7/1994 | Romi |
| 5,478,177 | A | | 12/1995 | Romi |

(Continued)

FOREIGN PATENT DOCUMENTS

| CN | 101474681 | 7/2009 |
| CN | 201361719 | 12/2009 |

(Continued)

OTHER PUBLICATIONS

Oct. 3, 2016 Final Office Action.

(Continued)

*Primary Examiner* — Eric A Gates
(74) *Attorney, Agent, or Firm* — Matthew S. Bedsole

(57) ABSTRACT

A boring head (10) having a movement transmission mechanism for selectively moving a cutting insert (20) a desired amount. The movement transmission mechanism includes a rotatable member selectively radially displacing the cutting insert the desired amount in a first direction and a primary member selectively radially displacing a balancing mass (50) in a second direction opposite the first direction while also axially displacing the balancing mass. The displacement of the balancing mass in the second direction effectively counters the displacement of the cutting insert in the first direction such that rotational balance of the boring head is automatically maintained.

11 Claims, 6 Drawing Sheets

(56) References Cited

U.S. PATENT DOCUMENTS

| | | | |
|---|---|---|---|
| 5,611,651 A | 3/1997 | Wohlhaupter | |
| 5,836,727 A * | 11/1998 | Scheer | B23B 29/0345 408/158 |
| 5,902,078 A | 5/1999 | Kaiser | |
| 5,909,986 A | 6/1999 | Kaiser | |
| 5,971,675 A | 10/1999 | Romi | |
| 6,053,082 A | 4/2000 | Rupp | |
| 7,260,877 B2 | 8/2007 | Broadley | |
| 7,585,139 B2 | 9/2009 | Stadelmann | |
| 7,871,226 B2 | 1/2011 | Fronius | |
| 8,684,638 B2 | 4/2014 | Buck | |
| 8,727,678 B2 | 5/2014 | De Souza | |
| 2004/0228695 A1 | 11/2004 | Clauson | |
| 2012/0269590 A1 | 10/2012 | Buck | |
| 2013/0064616 A1 | 3/2013 | Nakamura | |
| 2013/0064618 A1 | 3/2013 | Frota De Souza | |
| 2016/0096226 A1 * | 4/2016 | da Silva | B23B 29/03417 408/168 |

FOREIGN PATENT DOCUMENTS

| | | |
|---|---|---|
| DE | 3926026 | 2/1991 |
| DE | 4242063 C2 | 2/1995 |
| DE | 10244857 | 4/2004 |
| DE | 102007004383 A1 | 7/2008 |
| DE | 102007004385 A1 | 7/2008 |
| DE | 102009051843 A1 | 5/2011 |
| DE | 202015103584 U1 | 7/2015 |
| FR | 2568501 | 2/1986 |
| WO | WO2013026569 A1 | 2/2013 |

OTHER PUBLICATIONS

Sep. 19, 2016 Final office action.
Jun. 22, 2016 Office action (3 months) 1.
Wohlhaupter, Boring tools for finish machining.
Kaiser Precision Tooling Ltd., Kaiser Series 112 EWB.
Komet Precision Tools GmbH & Co. KG, MO3Speed Catalog.

* cited by examiner

AUTOBALANCING SYSTEM FOR BORING TOOL AND BORING TOOL INCORPORATING SAME

RELATED APPLICATION DATA

The present invention claim priority pursuant to 35 U.S.C. §119(a) to Brazilian Patent Application Number 1020140262466 filed Oct. 21, 2014 which is hereby incorporated by reference in its entirety.

FIELD

The present invention relates to a device for compensating masses, and particularly to a device for compensating masses in rotary boring heads used for finishing high precision bores. The present invention also relates to a rotary boring head incorporating such a mass compensating device.

BACKGROUND

In the prior art, boring heads are known of the type that are fixed on a machine tool main spindle such that there is only one single position under which the center of gravity of the movable sliding element of the tool holder and the cutting tool itself coincide with the rotating axis of the boring head.

It is also known in the prior art that with the displacement of the movable parts of the boring head, the center of gravity of the boring head changes its balancing position, which is normally located over the rotating axis, leading to the unbalancing of the boring head. This unbalancing action increases even more as a sliding element in the boring head to which a cutting element is coupled is radially displaced to the outside in relation to the rotating axis.

Owing to vibrations generated by the lack of balancing masses in the boring head, the harm caused to the precision and finishing of bores during machining have led to the addition of balancing devices to the boring heads.

In addition, since the bore precision is micrometric and rotation of current boring heads reaches extremely high levels, any unbalancing, even if only of a minute increment, leads to a quality loss of the machining job, because in these cases very close tolerances in the order of thousandths of a millimeter are under consideration.

In the prior art, an attempt has been made to overcome the unbalancing condition through the action of counterweights for mass displacement. However, it is a disadvantage that the known embodiments of such counterweights do not enable the rotary boring head to attain sufficiently high levels of graduated balancing operation adequate for each situation.

Additionally, known balancing systems typically require manual adjustment in order to satisfactorily balance the cutting tool which may be very time consuming, depending on the desired balancing quality.

Furthermore, other known balancing systems utilize numerous components machined to tight tolerances which typically utilize complex geometries.

Accordingly, there exists a need for improved systems for balancing rotary boring tools.

SUMMARY

Accordingly, deficiencies in the prior art are addressed by embodiments of the invention which are directed to a boring head having an automatic balancing means. Embodiments of the present invention provide for solutions which require less parts, looser tolerances, and generally simpler geometries than known solutions.

As one aspect of the invention, a boring head is provided. The boring head comprises: a housing disposed about a central longitudinal axis, the housing having a first end adapted to be coupled to a machine tool and an opposite second end, the opposite second end having a moveable portion structured to have a cutting insert selectively coupled thereto; and a movement transmission mechanism disposed at least one of on or in the housing. The movement transmission mechanism comprises: a rotatable member mounted to be rotatable relative to the housing; a balancing mass having a pair of opposing grooves defined in an outer surface thereof and each cooperatively engaged by a respective alignment pin extending inward from the housing; and a primary member disposed in the housing, the primary member being moveable along the longitudinal axis and operationally coupled to the rotatable member, the balancing mass, and the moveable portion. Rotation of the rotatable member a predetermined amount causes movement of the moveable portion a corresponding first predetermined distance in a first radial direction with respect to the longitudinal axis and movement of the balancing mass a corresponding second predetermined distance in a second radial direction opposite the first radial direction.

Each of the opposing grooves may be disposed at an angle with respect to the central longitudinal axis.

The primary member may be operatively coupled to the rotatable member via a drive key which engages the rotatable member.

The rotatable member may comprise a ring including an inner surface having a threaded portion that cooperatively engages a threaded portion on the drive key.

The rotatable member may comprises a ring including an inner surface having a threaded portion that cooperatively engages a first threaded portion disposed at a first end of the drive key and a second threaded portion disposed at an opposite second end of the drive key.

Rotation of the rotatable member a predetermined amount may cause movement of the moveable portion a corresponding first predetermined distance in a first radial direction with respect to the longitudinal axis and movement of the balancing mass a corresponding second predetermined distance in a second radial direction opposite the first radial direction along with movement of the balancing mass toward one of the first end or the second end of the housing.

The primary member may be disposed about a hollow tubular member rigidly coupled to the housing, the hollow tubular member being structured to provide for the flow of coolant from the first end to the second end of the housing.

The balancing mass may be constrained to movement only along an axis oriented obliquely to the central longitudinal axis.

Each of the opposing grooves may be disposed at an angle with respect to the central longitudinal axis and the axis oriented obliquely may be oriented at the angle with respect to the central longitudinal axis.

The main shaft may further comprise a linear portion and an angled portion, wherein the angled portion slidably engages an angled passage formed in a transverse rod, the transverse rod having the movable portion to which the cutting insert is structured to be coupled disposed at an end thereof.

As another aspect of the present invention, a boring head having a movement transmission mechanism for selectively moving a cutting insert a desired amount is provided. The movement transmission mechanism comprises: a means for selectively radially displacing the cutting insert the desired amount in a first direction; and a means for selectively radially displacing a balancing mass in a second direction opposite the first direction while also axially displacing the balancing mass. The displacement of the balancing mass in the second direction effectively counters the displacement of the cutting insert in the first direction such that rotational balance of the boring head is automatically maintained.

The radial displacement of the cutting insert and the radial displacement of the balancing mass may be carried out simultaneously by the movement transmission mechanism.

The movement transmission mechanism may be disposed in or on a housing, and the movement transmission mechanism may comprise a rotatable member adapted to be rotated a predetermined amount in order to cause the cutting insert to move the desired amount.

BRIEF DESCRIPTION OF THE DRAWINGS

A full understanding of the invention can be gained from the following description of the preferred embodiments when read in conjunction with the accompanying drawings in which.

DETAILED DESCRIPTION

Figure 1:
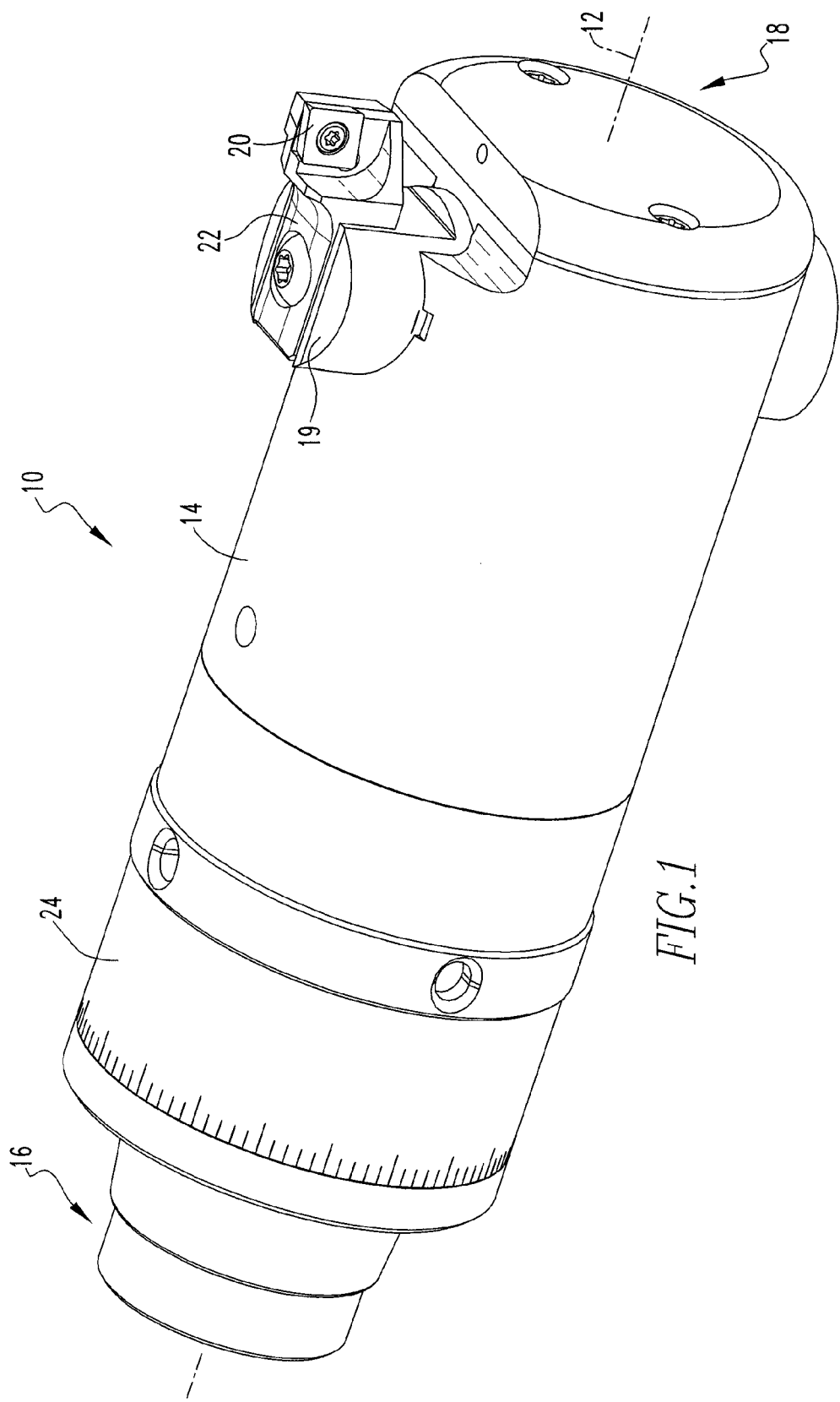
FIG. 1 shows an isometric view of a boring head in accordance with an example embodiment of the present invention.
Figure 2:
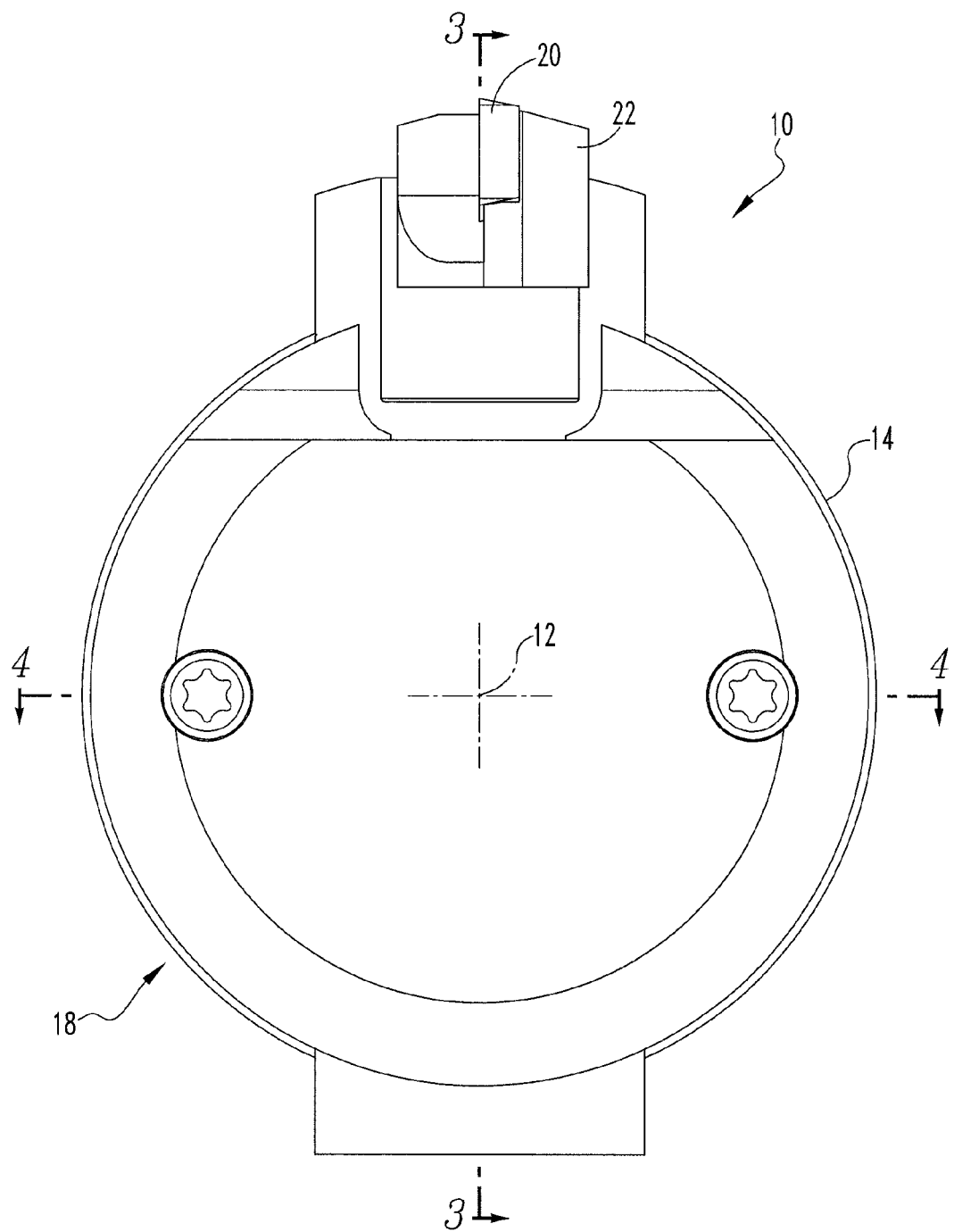
FIG. 2 is an end view of the boring head of FIG. 1.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

As used herein, the term "number" shall be used to refer to any non-zero quantity (i.e., one or any quantity greater than one).

As used herein, the term "about" shall be used to refer to a point near, or at, a particular identified point (i.e., proximate). Alternatively, the term "about" shall be used to refer that one or more elements are disposed around another element.

As used herein, the phrase "slidably engages" shall be used to refer to two or more elements that contact each other in a manner such that one or both of the elements may slide with respect to the other, while still maintaining contact.

FIGS. 1-6 depict an example boring head 10, in accordance with a non-limiting embodiment of the present invention, for conducting precision finish-boring operations on a workpiece (not shown) when boring head 10 is rotated about a central longitudinal axis 12 by a machine tool (not shown). Referring to FIG. 1, boring head 10 includes a body or housing 14 of substantially cylindrical shape disposed about the central longitudinal axis 12. The housing 14 includes a first end 16 adapted to be coupled to the previously mentioned machine tool (via any suitable means) and an opposite second end 18. Although depicted as having a substantially cylindrical shape of generally uniform diameter, it is to be appreciated that housing 14 may be formed from a number of substantially cylindrical portions of various diameter without varying from the scope of the present invention. A cutting insert 20, selectively coupled to a moveable portion 19 via a cartridge 22, is provided generally at or about opposite second end 18 of housing 14.

Figure 3:
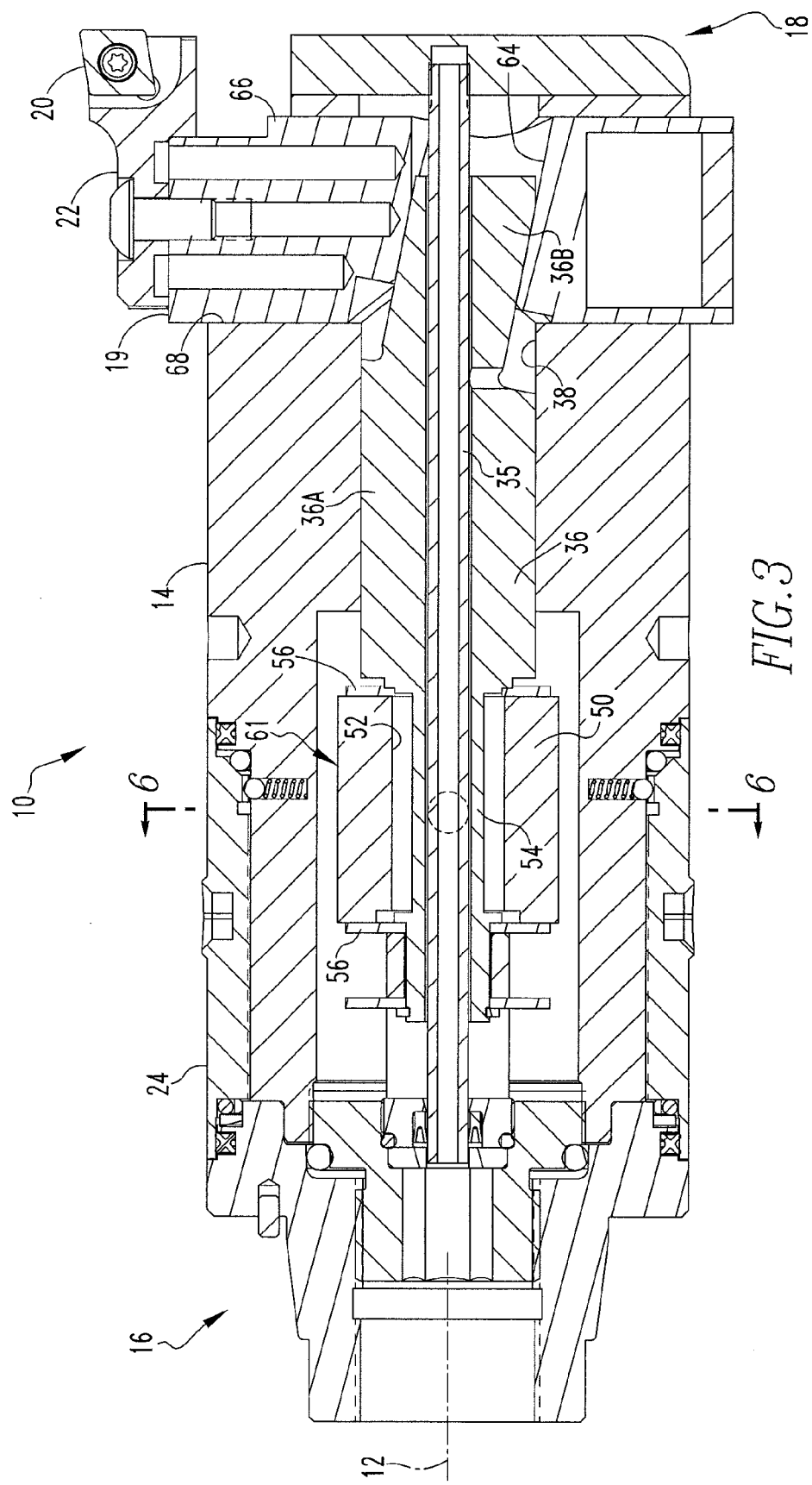
FIG. 3 is a sectional view of the boring head of FIG. 1 taken along line 3-3 of FIG. 2.

Referring to FIGS. 1 and 3, boring device 10 further includes a movement transmission mechanism (not numbered) which comprises a rotatable member, such as ring 24 in the illustrated embodiment, mounted to be rotatable relative to housing 14. As described below, rotation of ring 24 a predetermined amount causes corresponding movement of the cartridge 22 in a direction perpendicular to the longitudinal axis 12 of housing 14, thus resulting in radial displacement of cutting insert 20 in a corresponding predetermined amount. Such controlled movement is achieved through the operative or operational coupling of several components as described in detail below. In the illustrated example boring device 10, rotatable ring 24 of the movement transmission mechanism is rotatable and externally graduated. The ring 24 is arranged to be generally coaxial with housing 14. Although shown as a ring 24 disposed about longitudinal axis 12, it is to be appreciated that a dial type (not pictured) rotatable member (e.g., without limitation, rotatable about an axis transverse to longitudinal axis 12) or other suitable member could instead be substituted for ring 24 without varying from the scope of the present invention.

Figure 4:
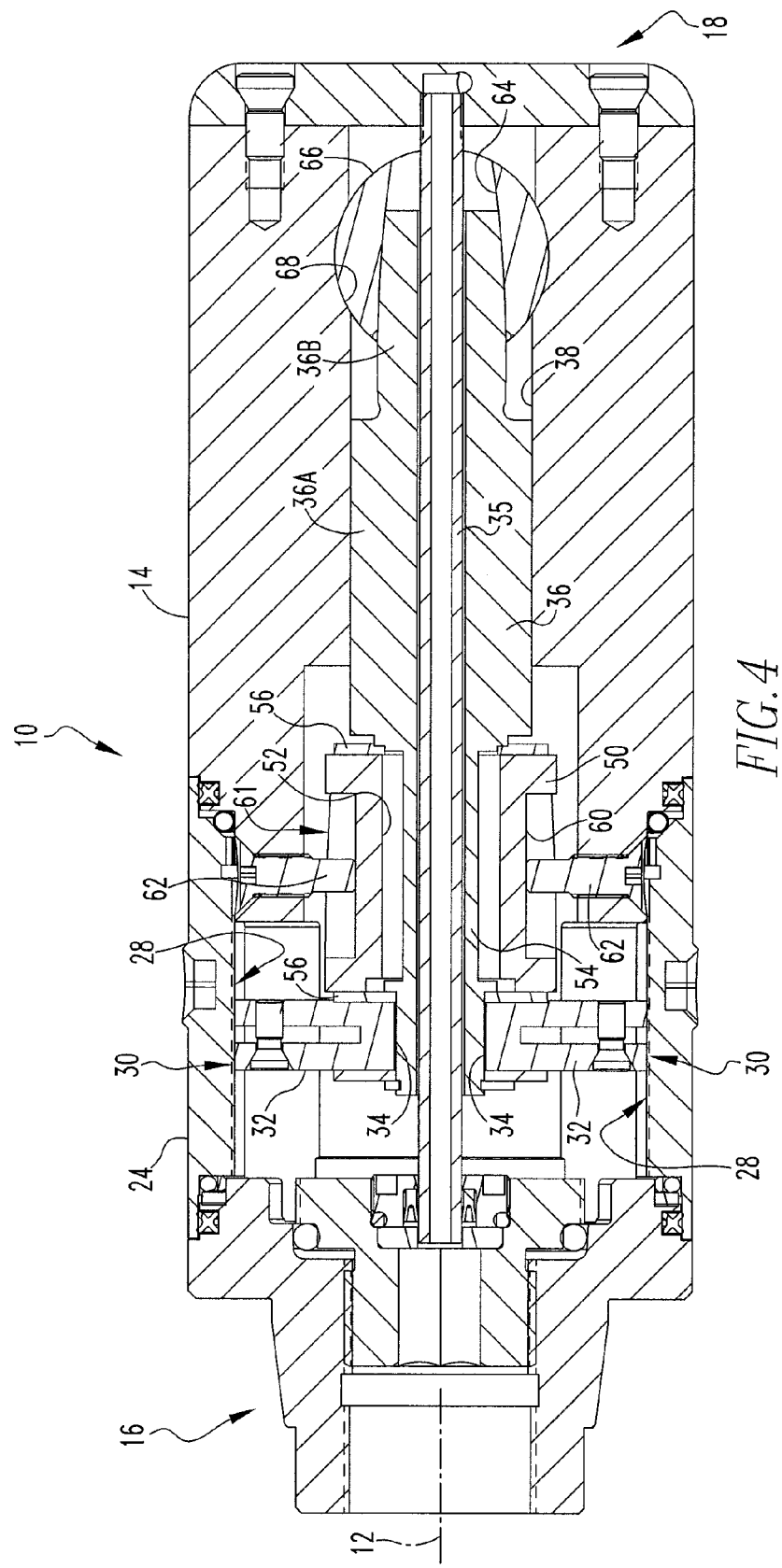
FIG. 4 is a sectional view of the boring head of FIG. 1 taken along line 4-4 of FIG. 2.

Referring to the sectional view of FIG. 4, an inward facing surface (not numbered) of ring 24 is provided with a number of threads (not shown in detail) thus forming a threaded portion 28 formed generally as a female threaded portion within ring 24 with a thread pitch disposed substantially parallel to longitudinal axis 12. Continuing to refer to the sectional view of FIG. 4, the threaded portion 28 of ring 24 is cooperatively engaged by correspondingly threaded portions 30 disposed at radially outward ends (not numbered) of a drive key 32. Drive key 32 includes a central aperture 34 though which a primary member 36 is disposed, and rigidly coupled therein. As shown in the sectional views of FIGS. 3-6, primary member 36 is disposed coaxially with longitudinal axis 12 and, more particularly, is disposed within a central passage 38 formed in housing 14 and about a hollow tubular member 35 which is rigidly coupled to housing 14. Such arrangement of primary member 36 within central passage 38 of housing 14 acts to constrain radial movement of primary member 36 but allows for axial movement of primary member 36 along longitudinal axis 12. Hollow tubular member 35 provides for a passageway for the flow of coolant or other suitable fluid to pass generally from first end 16 to opposite second end 18 of housing 14. Although shown including one drive key 32, it is to be appreciated that multiple (i.e., 2 or more) drive keys 32 may be employed without varying from the scope of the present invention.

Primary member 36 is generally cylindrical in shape but may have a varying radius, such as shown in the example embodiment illustrated in the FIGS. As shown in FIG. 3, primary member 36 includes a linear portion 36A and an angled portion 36B disposed nearer second end 18 of housing 14. Angled portion 36B slidably engages an angled passage 64 formed in a transverse rod 66 which itself is disposed within, and slidably engages a transverse bore 68 which extends through housing 14 generally at or about second end 18. Angled portion 36B and angled passage 64 are preferably generally cylindrical in shape, such as shown in the illustrated embodiment, however other shapes may be used without varying from the scope of the present invention. Moveable portion 19 to which cartridge 22 and cutting insert 20 are selectively coupled, as previously described, is provided at an end of transverse rod 66 such that cutting insert 20 translates radially with respect to longitudinal axis 12 upon movement of transverse rod 66 in conjunction with axial movement of primary member 36 along longitudinal axis 12.

In order to maintain static balance of the boring device 10, a balancing mass 50 is provided within housing 14. As shown in FIGS. 3-6, the balancing mass 50 is generally cylindrical in shape and includes a central bore 52 disposed about a portion 54 of primary member 36. Central bore 52 is dimensioned with respect to such portion 54 such that balancing mass 50 is moveable radially (i.e., up and down in FIGS. 3 and 5, perpendicular to longitudinal axis 12) with respect to primary member 36. Balancing mass 50, however, is constrained axially with respect to primary member 36 by washers 56 or other suitable structures, such that balancing mass 50 translates along with primary member 36 within housing 14.

Figure 5:
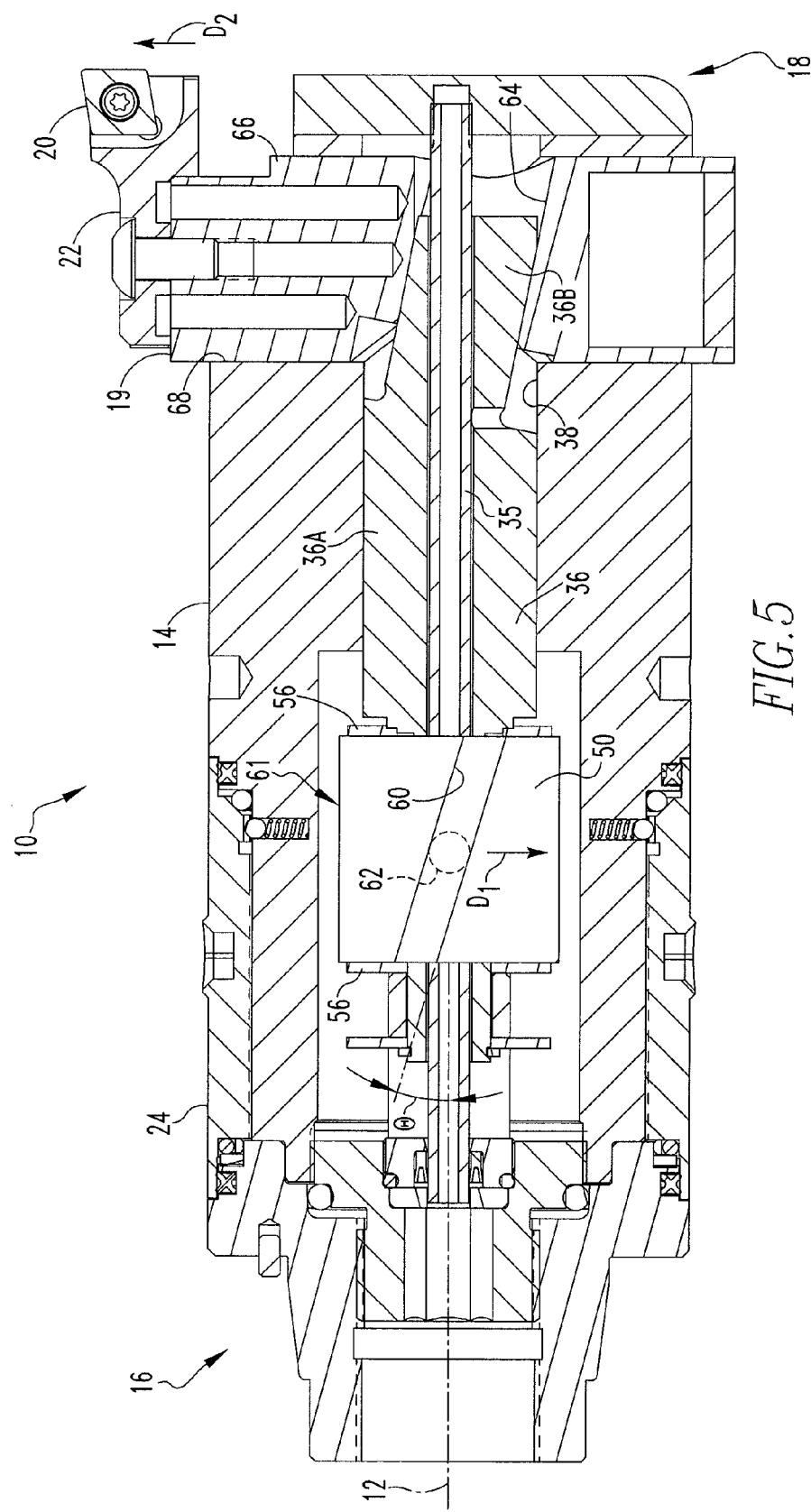
FIG. 5 is a partial sectional view of the boring head of FIG. 1 taken along line 3-3 of FIG. 2 with a portion of the internal components shown in non-sectional form in order to show internal details of the embodiment.
Figure 6:
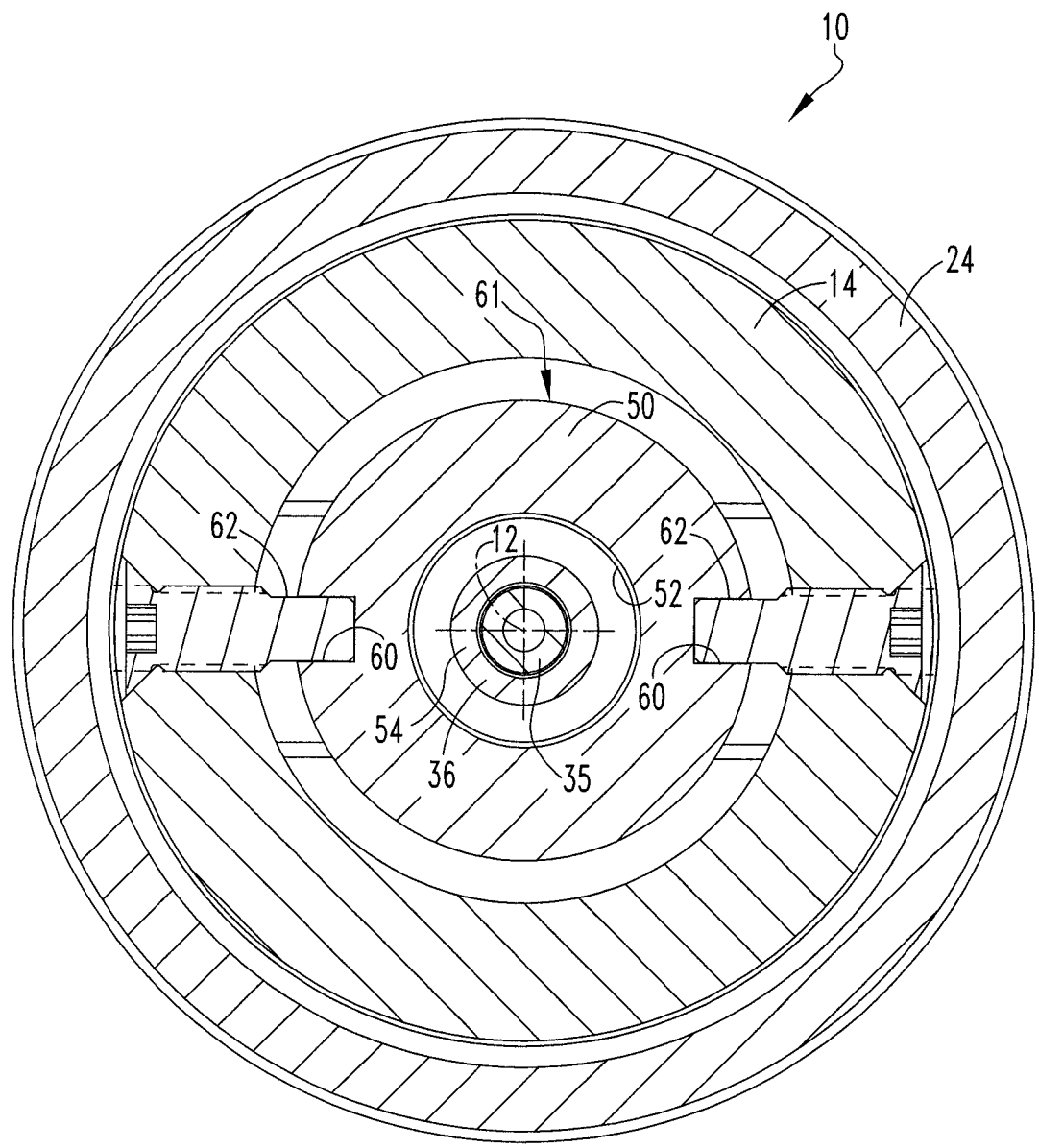
FIG. 6 is a sectional view of the boring head of FIG. 1 taken along line 6-6 of FIG. 3.

As shown in FIGS. 4-6, balancing mass 50 includes a pair of external grooves 60 disposed opposite each other on the external surface 61 of the balancing mass 50 which are cooperatively slidably engaged by alignment pins 62 which extend inward from housing 12. As shown in the partial-sectional view of FIG. 5 in which balancing mass 50 is not shown sectioned, each groove 60 is disposed at an angle $\theta$ with respect to longitudinal axis 12 when viewed axially along pin 62 (shown in dashed line in FIG. 5). Each of the alignment pins 62 slidably interact with a respective groove 60 in balancing mass 50 such that as balancing mass 50 translates axially along longitudinal axis 12 with primary member 36 (to which balancing mass 50 is axially constrained) balancing mass 50 translates in a direction transverse to the longitudinal axis 12 as dictated by groove 60. In other words, referring to the arrangement shown in FIG. 5, when primary member 36 is translated to the right (i.e., toward second end 18 of housing 14), balancing mass 50 is translated generally downward to the right. Alternatively, when primary member 36 is translated to the left (i.e., toward first end 16 of housing 14), balancing mass 50 is translated upward and to the left.

In order to maintain static balance of boring device 10, the particular size and required radial movement of the balancing mass 50 is dependent on the amount of unbalance (product of amount of mass displaced times displacement of such mass) caused by the radial movement of transverse rod 66 and attached components 22 and 20. It is to be appreciated that maintaining static balance is of primary concern in a boring device 10 while the dynamic balance of such device is of lesser concern due to the relatively short length of the boring device 10 and rigidness of housing 14.

In order to minimize the space occupied by the balancing mass 50, balancing mass 50 is preferably made out of a high density material such as, for example, without limitation, tungsten alloy, although other suitable materials may be used without varying from the scope of the present invention. The balancing mass 50 is calculated to generate the same unbalance (directed in an opposite direction) as the transverse rod 66, cartridge 22 and insert 20 (including screws). The product of the balancing mass and its displacement needs to be equal to the product of the summation of masses of 66, 22, 20 and the radial displacement thereof. It is to be appreciated that the angle $\theta$ of grooves 60 (which causes radial movement of balancing mass 50) does not need to be the same as the angle (not numbered) of angled portion 36B of primary member 36. A smaller (or less dense) balancing mass can be used if the angle $\theta$ of grooves 60 is greater (thus causing greater radial movement of balancing mass 50 per axial movement of primary member 36). Conversely, a larger (or more dense) mass may be required if the angle $\theta$ of grooves 60 is less steep.

Having thus described the basic components of the movement transmission mechanism of boring head 10, an overview of its operation will now be provided.

In order to induce a desired radial movement of cutting insert 20 with respect to boring head 10, an operator simply rotates ring 24 a desired amount with respect to housing 14 according to the graduations disposed on ring 24. As ring 24 is rotated, the threaded portion 28 on the inner surface thereof interacts with the correspondingly threaded portions 30 of the drive key(s) 32, causing the drive key(s) 32, along with the primary member 36 rigidly coupled thereto, to translate along the axis 12 either toward first end 16 or toward second end 18 of housing 14, depending on the direction in which ring 24 is rotated (as well as the handedness of the correspondingly threaded portions 28 and 30).

When the primary member 36 is thus caused to translate axially along the longitudinal axis 12. As previously discussed, as primary member 36 translates toward second end 18 of housing 14, the interaction between angled grooves 60 of balancing mass 50 and alignment pins 62 causes balancing mass 50, in addition to being shifted axially toward second end 18, to be shifted radially in a first direction $D_1$ (FIG. 5) with respect to housing 14 (and thus longitudinal axis 12) that is downward with respect to the cross-sectional view as oriented in FIG. 5. In other words, such arrangement provides for the balancing mass 50 to be constrained to movement only along an axis (not shown) oriented obliquely to the central longitudinal axis 12.

Concurrently with the interaction of the grooves 60 of the balancing mass 50 and the alignment pins 62 of the housing 14 as primary member 36 translates along longitudinal axis 12, the angled portion 36B of primary member 36 and the angled passage 64 of transverse rod 66 interact in a manner that causes transverse rod 66, and thus cartridge 22 and cutting insert 20 which are coupled thereto, to be shifted radially in a second direction $D_2$ (FIG. 5) with respect to housing 14 (and thus longitudinal axis 12) that is upward with respect to the cross-sectional view as oriented in FIG. 5, and notably opposite in direction to the direction $D_1$ (FIG. 5) in which balancing mass 50 is simultaneously moved.

Alternatively through such interactions, translation of primary member 36 toward first end 16 of housing 14 (as caused by rotation of ring 24 in the opposite direction from the previous example) results in balancing mass 50 being translated in a direction opposite $D_1$ (as well as toward first end 16) while cutting insert 20 is translated inward (opposite $D_2$) toward longitudinal axis 12.

It is to be appreciated that through such arrangement of the movement transmission mechanism, any change to the overall balance of the boring tool 10 resulting from radial movement of the cutting insert 20 and related components is automatically compensated by the movement of the balancing mass 50 in the opposite direction.

From the foregoing it is to be appreciated that embodiments of the present invention provide superior balancing solutions as compared to those presently available for boring tools. Among such improvements is a reduced number of complex parts, reduced complications resulting from misalignment of parts, and reduced manufacturing costs due to both reduced complexity of parts as well as reduction in the overall number of parts needed.

While specific embodiments of the invention have been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

The invention claimed is:

1. A boring head comprising:
   a housing disposed about a central longitudinal axis, the housing having a first end adapted to be coupled to a machine tool and an opposite second end, the opposite second end having a moveable portion structured to have a cutting insert selectively coupled thereto; and
   a movement transmission mechanism disposed at least one of on or in the housing, the movement transmission mechanism comprising:
      a rotatable member mounted to be rotatable relative to the housing;
      a balancing mass having a pair of opposing grooves defined in an outer surface thereof and each cooperatively engaged by a respective alignment pin extending inward from the housing; and
      a primary member disposed in the housing, the primary member being moveable along the longitudinal axis and operationally coupled to the rotatable member, the balancing mass, and the moveable portion,
   wherein rotation of the rotatable member a predetermined amount causes movement of the moveable portion a corresponding first predetermined distance in a first radial direction with respect to the longitudinal axis and movement of the balancing mass a corresponding second predetermined distance in a second radial direction opposite the first radial direction; and
   wherein each of the opposing grooves are disposed at an angle ($\theta$) with respect to the central longitudinal axis, the angle ($\theta$) being oblique to the central longitudinal axis.

2. The boring head of claim 1 wherein the primary member is operatively coupled to the rotatable member via a drive key which engages the rotatable member.

3. The boring head of claim 2 wherein the rotatable member comprises a ring including an inner surface having a threaded portion that cooperatively engages a threaded portion on the drive key.

4. The boring head of claim 2 wherein the rotatable member comprises a ring including an inner surface having a threaded portion that cooperatively engages a first threaded portion disposed at a first end of the drive key and a second threaded portion disposed at an opposite second end of the drive key.

5. The boring head of claim 1 wherein the primary member is disposed about a hollow tubular member rigidly coupled to the housing, the hollow tubular member being structured to provide for the flow of coolant from the first end to the second end of the housing.

6. The boring head of claim 1 wherein the balancing mass is constrained to movement only along an axis oriented obliquely to the central longitudinal axis.

7. The boring head of claim 6 wherein the axis oriented obliquely is oriented at the angle ($\theta$) with respect to the central longitudinal axis.

8. The boring head of claim 1 wherein the primary member further comprises a linear portion and an angled portion, wherein the angled portion slidably engages an angled passage formed in a transverse rod, the transverse rod having the movable portion to which the cutting insert is structured to be coupled disposed at an end thereof.

9. A boring head comprising:
   a housing disposed about a central longitudinal axis, the housing having a first end adapted to be coupled to a machine tool and an opposite second end, the opposite second end having a moveable portion structured to have a cutting insert selectively coupled thereto; and
   a movement transmission mechanism disposed at least one of on or in the housing, the movement transmission mechanism comprising:
      a rotatable member mounted to be rotatable relative to the housing;
      a balancing mass having a pair of opposing grooves defined in an outer surface thereof and each cooperatively engaged by a respective alignment pin extending inward from the housing; and
      a primary member disposed in the housing, the primary member being moveable along the longitudinal axis and operationally coupled to the rotatable member, the balancing mass, and the moveable portion,
   wherein rotation of the rotatable member a predetermined amount causes movement of the moveable portion a corresponding first predetermined distance in a first radial direction with respect to the longitudinal axis and movement of the balancing mass a corresponding second predetermined distance in a second radial direction opposite the first radial direction; and
   wherein rotation of the rotatable member a predetermined amount causes movement of the moveable portion a corresponding first predetermined distance in a first radial direction with respect to the longitudinal axis and movement of the balancing mass a corresponding second predetermined distance in a second radial direction opposite the first radial direction along with movement of the balancing mass toward one of the first end or the second end of the housing.

10. A boring head comprising:
    a housing disposed about a central longitudinal axis, the housing having a first end adapted to be coupled to a machine tool and an opposite second end, the opposite second end having a moveable portion structured to have a cutting insert selectively coupled thereto; and
    a movement transmission mechanism disposed at least one of on or in the housing, the movement transmission mechanism comprising:
       a rotatable member mounted to be rotatable relative to the housing;

a balancing mass having a pair of opposing grooves defined in an outer surface thereof and each cooperatively engaged by a respective alignment pin extending inward from the housing; and a primary member disposed in the housing, the primary member being moveable along the longitudinal axis and operationally coupled to the rotatable member, the balancing mass, and the moveable portion, wherein rotation of the rotatable member a predetermined amount causes movement of the moveable portion a corresponding first predetermined distance in a first radial direction with respect to the longitudinal axis and movement of the balancing mass a corresponding second predetermined distance in a second radial direction opposite the first radial direction; and wherein the balancing mass is constrained to movement only along an axis oriented obliquely to the central longitudinal axis.

11. The boring head of claim 10 wherein each of the opposing grooves are disposed at an angle with respect to the central longitudinal axis and wherein the axis oriented obliquely is oriented at the angle with respect to the central longitudinal axis.

\* \* \* \* \*